US012358310B2

(12) United States Patent
Yang et al.

(10) Patent No.: US 12,358,310 B2
(45) Date of Patent: Jul. 15, 2025

(54) PRINTING DEVICE

(71) Applicant: Shenzhen Anker Smart Technology Co., Ltd, Shenzhen (CN)

(72) Inventors: Pan Yang, Shenzhen (CN); Zhiyu Wang, Shenzhen (CN); Jia Xu, Shenzhen (CN)

(73) Assignee: Shenzhen Anker Smart Technology Co., Ltd, Shenzhen (CN)

( * ) Notice: Subject to any disclaimer, the term of this patent is extended or adjusted under 35 U.S.C. 154(b) by 155 days.

(21) Appl. No.: 18/383,934

(22) Filed: Oct. 26, 2023

(65) Prior Publication Data

US 2024/0140119 A1 May 2, 2024

(30) Foreign Application Priority Data

Oct. 26, 2022 (CN) ......................... 202222850486.0

(51) Int. Cl.
*B41J 19/20* (2006.01)
*B41J 19/06* (2006.01)
*B41J 29/02* (2006.01)

(52) U.S. Cl.
CPC ............... *B41J 29/02* (2013.01); *B41J 19/06* (2013.01); *B41J 19/20* (2013.01)

(58) Field of Classification Search
CPC ... B41J 19/00; B41J 19/06; B41J 19/14; B41J 19/142; B41J 19/20
See application file for complete search history.

(56) References Cited

U.S. PATENT DOCUMENTS 5,332,321 A * 7/1994 Beauchamp ............. B41J 19/00 400/354
5,749,551 A * 5/1998 Torres ........................ B41J 3/28 248/205.1
6,575,646 B1 * 6/2003 Guillen ................... F16C 29/02 400/354
2006/0098041 A1 * 5/2006 Lim ..................... B41J 2/16585 347/37

FOREIGN PATENT DOCUMENTS

DE 60309924 T2 * 6/2007 .............. B41J 19/00

* cited by examiner

*Primary Examiner* — Julian D Huffman
(74) *Attorney, Agent, or Firm* — Banner & Witcoff, Ltd.

(57) ABSTRACT

An example printing device comprises at least one moving module, which includes a profile assembly and a slider assembly. The profile assembly includes two guiding members that are spaced from each other, and the two guiding members respectively have a first guiding groove and a second guiding groove arranged in a preset direction. The slider assembly includes a slider body and an elastic member, where the slider body is in contact with the groove wall of the first guiding groove and is slidably connected in the preset direction; and the elastic member is fixedly connected with the slider body and is in contact with the groove wall of the second guiding groove and is slidably connected in the preset direction. The elastic member can deform to make the slider body press tightly against the corresponding guiding member, so that the printing device can improve its printing quality.

20 Claims, 3 Drawing Sheets

13 20 10 111 11 112 12 121 a 40 32 30 33 31

PRINTING DEVICE

CROSS-REFERENCE TO RELATED APPLICATION

The present application claims priority to CN Application No. 202222850486.0, filed on Oct. 26, 2022. The above application is incorporated by reference in its entirety.

FIELD

This application relates to the field of printing device technology, particularly the printing device.

BACKGROUND

In the related technical field, the movement of a printing device on the Z-axis is mostly driven by the rolling friction of multiple V-wheels on both sides of the profile, and the slider is controlled to press the guide rail surface by adjusting the eccentric nut of the V-wheel. When the guide rail surface of the profile is not parallel, it will cause serious layering phenomenon in the printed product.

SUMMARY

The example of this application provides a printing device, which can improve the printing quality of the printing device.

The example of this application provides a printing device, comprising at least one moving module, the moving module comprises a slider component (e.g., slider assembly) and a profile component (e.g., profile assembly).

The profile component includes two spaced guiding members. The two guiding members respectively have a first guiding groove and a second guiding groove arranged in a preset direction;

The slider component comprises: a slider body, which is in contact with the groove wall surface of the first guiding groove and is slidably connected in a preset direction. The slide component further comprises an elastic member, which is fixedly connected with the slider body, and the elastic member is in contact with the groove wall surface of the second guiding groove and is slidably connected in the preset direction. The elastic member can deform to press the slider body against the corresponding guiding member.

Based on the printing device of this application example, the slider body is in contact with the groove wall surface of the first guiding groove, and the elastic member is in contact with the groove wall surface of the second guiding groove. In this way, the contact area between the slider component and the profile body is larger. For example, even if there are uneven areas in the contact surface between the groove wall surface of the first guiding groove and the profile component, or between the groove wall surface of the second guiding groove and the profile component, the flat area in the contact surface between the groove wall surface of the first guiding groove and the profile component, or between the groove wall surface of the second guiding groove and the profile component can still guide the slider component. In this way, the printing quality of the printing device is improved. On the other hand, in the related technology, it is necessary to control the interaction force between the V-wheel and the profile by adjusting the eccentric nut of the V-wheel to make the V-wheel press against the profile. In this application example, the elastic member constantly deforms to make the slider body press against the groove wall of the first guiding groove, and the elastic member can deform at any time and anywhere. When the groove wall of the first guiding groove or the second guiding groove is uneven, the deformation amount of the elastic member can increase or decrease to automatically adjust the interaction force between the slider body and the groove wall of the first guiding groove to achieve the adaptive adjustment of the interaction force between the slider body and the groove wall of the first guiding groove.

BRIEF DESCRIPTION OF THE DRAWINGS

In order to more clearly illustrate the technical solutions in the examples of the present application or in the prior art, the drawings needed in the description of the examples or the prior art will be briefly introduced below. Obviously, the drawings described below are only some examples of the present application, and for those skilled in the art, other drawings can be obtained based on these drawings without creative effort.

Figure 1:
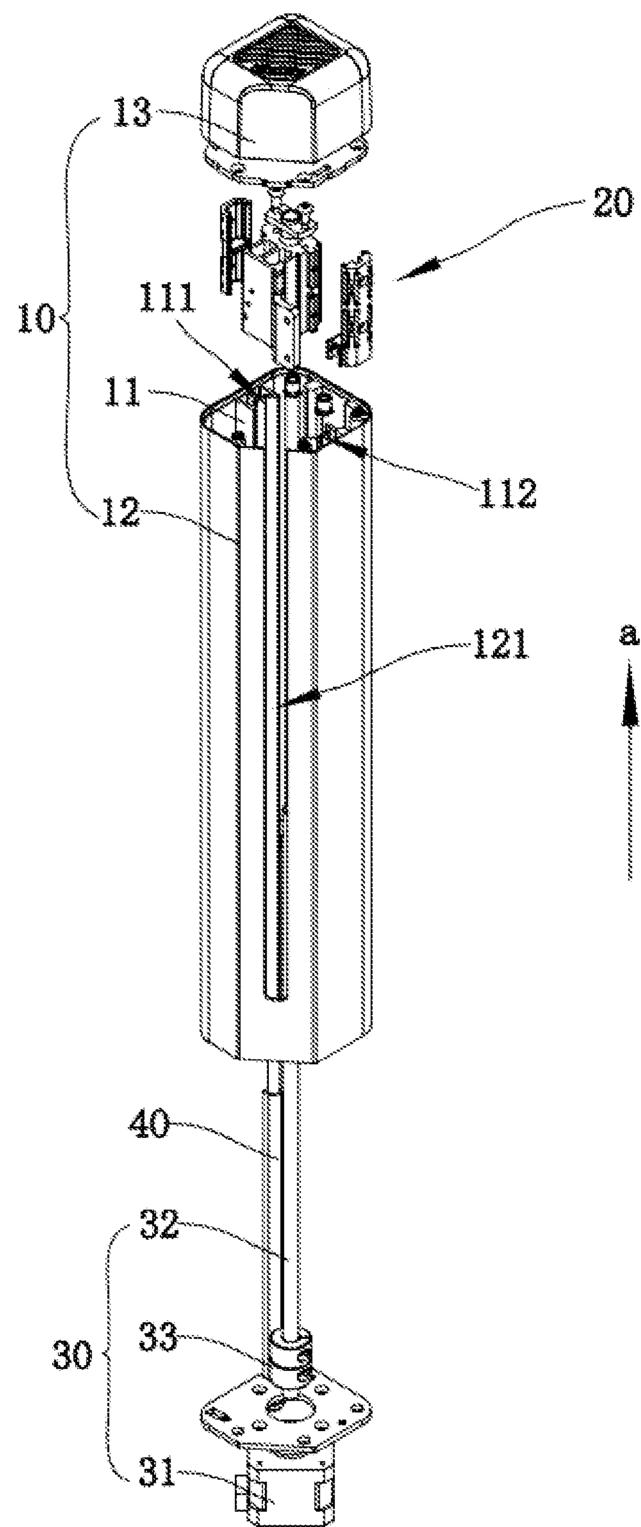
FIG. 1 is a schematic diagram of an exploded view of the moving module in an example of the present application.

Reference numerals: 10, profile component; 11, guiding member; 111, first guiding groove; 1111, bottom wall; 1112, side wall; 112, second guiding groove; 12, profile body; 121, avoidance opening; 13, end cap; 20, slider component; 21, slider body; 211, receiving cavity; 212, body part; 213, pressure receiving part; 214, pressure applying part; 215, connecting part; 22, elastic member; 30, drive component; 31, drive member; 32, screw; 33, coupler; 40, cable; a, preset direction.

DETAILED DESCRIPTION

In order to make the objectives, technical solutions and advantages of the present application more clear and understandable, the present application will be further detailed with reference to the accompanying drawings and examples. It should be understood that the specific examples described here are only used to explain the present application and are not intended to limit the present application.

In the related technical field, the movement of the printing device on the Z-axis is mostly driven by the rolling friction of multiple V-wheels on both sides of the profile, and the slider is controlled to press the guide rail surface by adjusting the eccentric nut of the V-wheel. When the guide rail surface of the profile is not parallel, it will cause serious layering phenomenon in the printed product.

Figure 2:
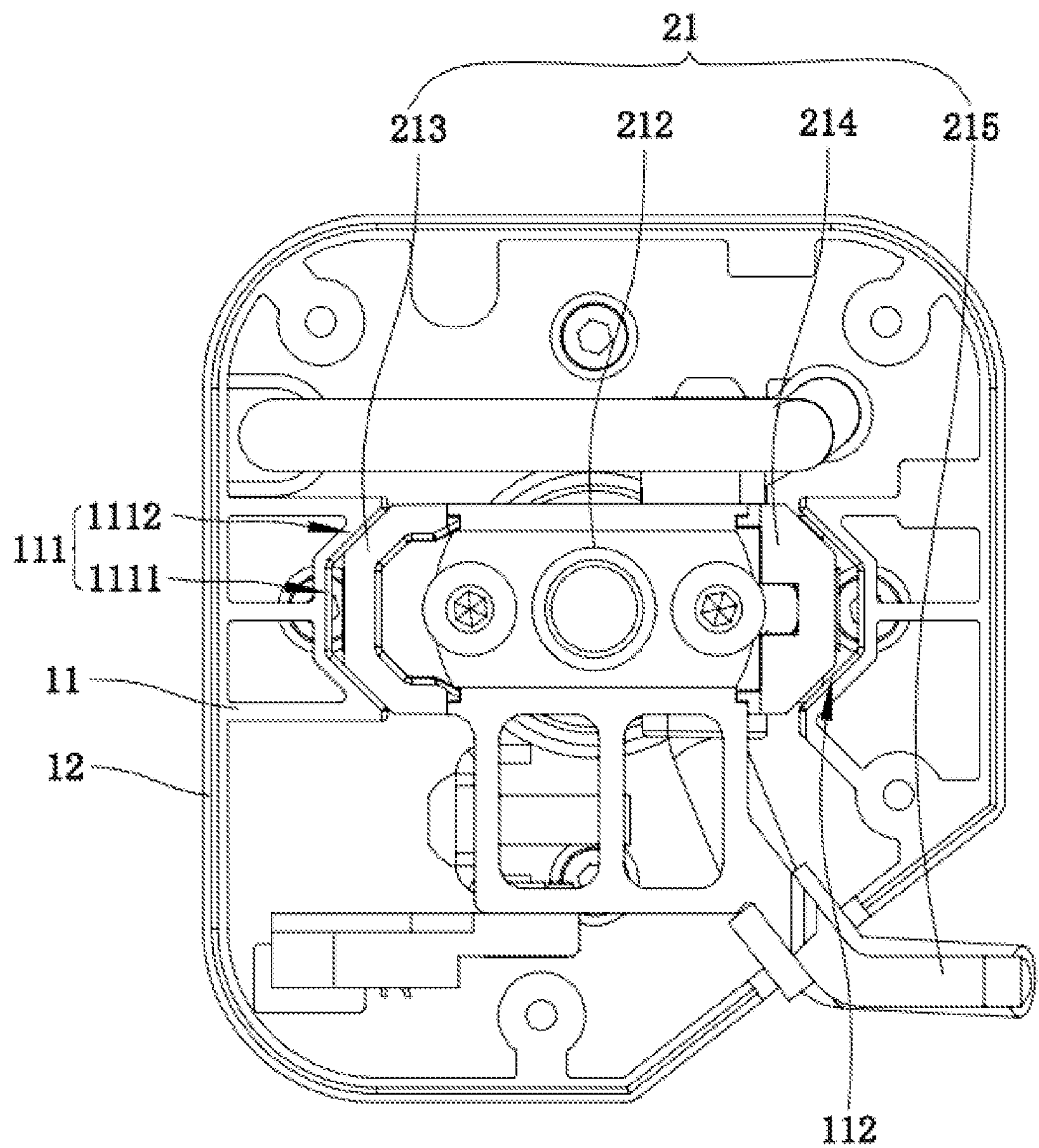
FIG. 2 is a top view of the moving module in an example of the present application with the end cap removed.
Figure 3:
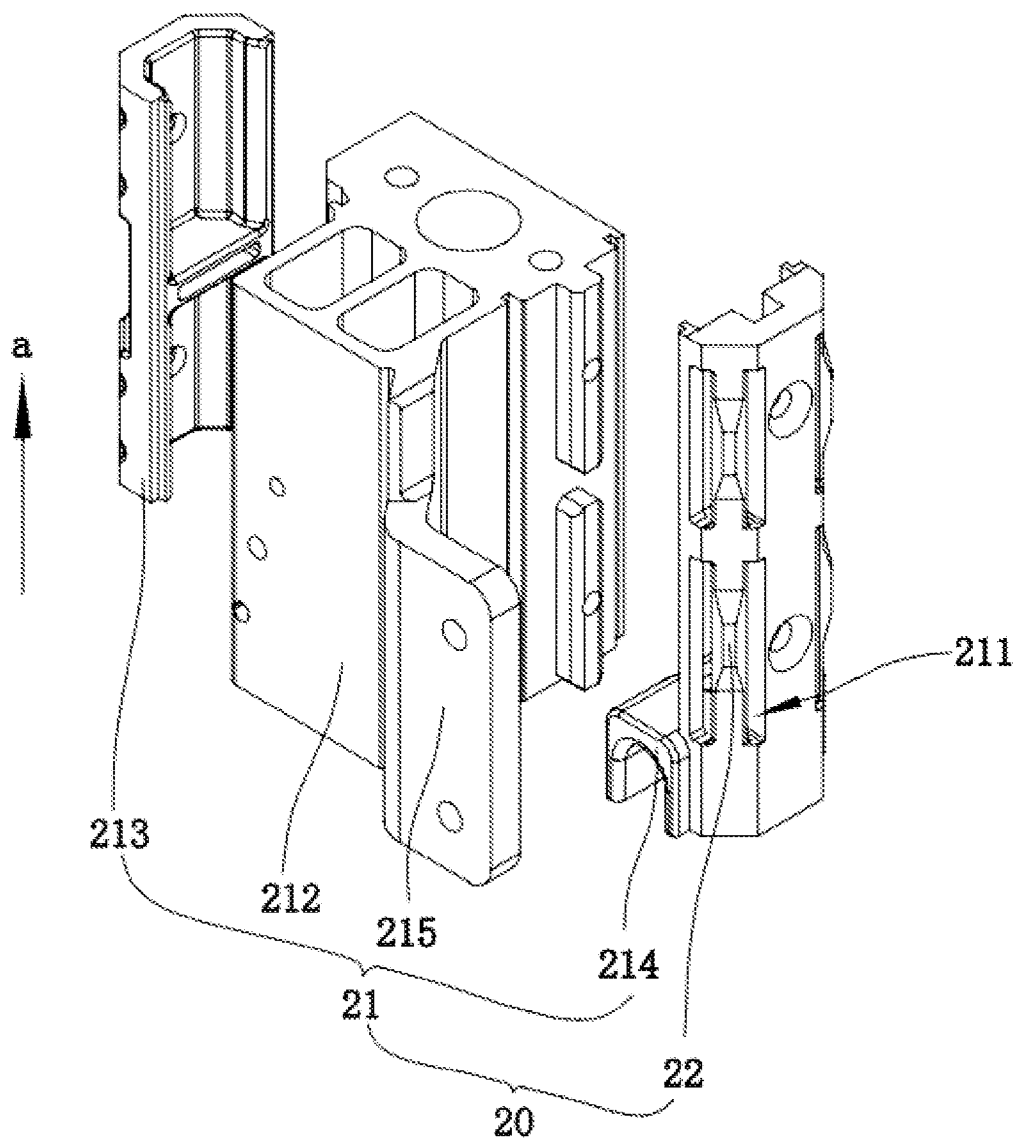
FIG. 3 is a schematic diagram of an exploded view of the slider component in an example of the present application.

In order to solve the above technical problems, please refer to FIGS. 1 to 3. As shown in these figures, this application proposes a printing device with higher printing quality.

Please refer to FIGS. 1 to 3, which illustrate that the printing device comprises at least one moving module, and the moving module includes a profile component 10 and a slider component 20. The profile component 10 comprises two spaced guiding members 11, and the two guiding members 11 respectively have a first guiding groove 111 and a second guiding groove 112 arranged in a preset direction a. The slider component 20 comprises a slider body 21 and an elastic member 22, where the slider body 21 is in contact with the groove wall surface of the first guiding groove 111 and is slidably connected with the groove wall of the first guiding groove 111 in the preset direction a. The elastic member 22 is further fixedly connected with the slider body 21 and is in contact with the groove wall surface of the second guiding groove 112, so that the groove wall of the second guiding groove 112 is slidably connected in the preset direction a, and the elastic member 22 can deform to press the slider body 21 against the corresponding guiding member 11.

The printing device in the example of this application can be a 3D printing device, or a D printing device, and the example of this application does not limit this. When the printing device is a D printing device, the moving module can be an X-axis moving module or a Y-axis moving module, and the example of this application does not limit this. The moving direction of the X-axis moving module and the moving direction of the Y-axis moving module form a two-dimensional coordinate system. When the printing device is a 3D printing device, the moving module can be an X-axis moving module, a Y-axis moving module or a Z-axis moving module, and the example of this application also does not limit this. The moving direction of the X-axis moving module, the moving direction of the Y-axis moving module, and the moving direction of the Z-axis moving module form a three-dimensional coordinate system. In the example of this application, the printing device is exemplified by a 3D printing device, and the moving module is exemplified by a Z-axis moving module to illustrate the printing device, that is, the preset direction a is the printing direction of the Z-axis moving module of the 3D printing device, where the Z-axis moving module can connect the X-axis moving module, the X-axis moving module connects the Y-axis moving module, and any moving module can connect the printing nozzle; or, the Z-axis moving module can connect the Y-axis moving module, the Y-axis moving module connects the X-axis moving module, and any moving module can connect the printing nozzle.

The guiding member 11 is used to open the first guiding groove 111 or the second guiding groove 112. Since the groove walls of the first guiding groove 111 and the second guiding groove 112 are slidably connected with the slider component 20, in order to improve the wear resistance of the guiding member 11, in some examples of the present application, the guiding member 11 is made of wear-resistant material to extend the life of the guiding member 11. At the same time, whether the groove walls of the first guiding groove 111 and the second guiding groove 112 are flat determines the printing quality of the printing device. In order to improve the structural strength of the guiding member 11, in some examples of the present application, the guiding member 11 is made of hard wear-resistant material, for example, copper, high manganese steel or wear-resistant high chromium cast iron, etc. The hard wear-resistant material ensures the wear resistance of the guiding member 11, and improves the structural strength of the guiding member 11, and reduces the deformation of the guiding member 11, which in turn causes the groove walls of the first guiding groove 111 and the second guiding groove 112 to twist, thereby ensuring the printing quality of the printing device. In other examples of the present application, the guiding member 11 is made of hard material, and a wear-resistant layer is formed on the groove wall of the guiding groove of the guiding member 11. For example, the wear-resistant layer can be formed by thermal spraying or chemical bonding processes such as nano-ceramic coating or carbide coating.

The groove wall of the first guiding groove 111 is used to guide the slider body 21, and the groove wall of the second guiding groove 112 is used to guide the elastic member 22. The length of the first guiding groove 111 and the second guiding groove 112 along the preset direction a determines the moving distance of the slider component 20 along the preset direction a. The length of the guiding member 11, the first guiding groove 111 and the second guiding groove 112 can be set according to the actual needs of the printing device.

The elastic member 22 is used to deform to apply a force to the slider body 21 to press against the corresponding guiding member 11, thereby pressing the slider body 21 against the corresponding guiding member 11. Since the elastic member 22 needs to deform and considering that the elastic member 22 is slidably connected with the corresponding guiding member 11, in some examples of the present application, the elastic member 22 is made of wear-resistant elastic material, such as thermoplastic polyurethane or butyl rubber, etc. Alternatively, in other examples of the present application, the surface of the elastic member 22 has a wear-resistant layer formed of wear-resistant material, the wear-resistant layer can be realized by thermal spraying or chemical bonding processes, and the material of the wear-resistant layer can be epoxy resin or polyester resin, etc. The example of the present application does not limit the shape of the deformation, and the elastic member 22 can be set to any shape, as long as the elastic member 22 can deform. The elasticity and size of the elastic member 22 are to be set to match the weight of the slider body 21, and the elasticity and size of the elastic member 22 are to ensure that the elastic member 22 has enough elastic potential energy after deformation, thereby making the elastic force converted by the elastic potential energy press the slider body 21 against the corresponding guiding member 11. In some examples of the present application, the number of elastic members 22 can be one; in other examples of the present application, the number of elastic members 22 can be multiple, and the example of the present application does not limit this.

Based on the printing device of the example of this application, the slider body 21 is in contact with the groove wall surface of the first guiding groove 111, and the elastic member 22 is in contact with the groove wall surface of the second guiding groove 112. In this way, the contact area between the slider component 20 and the profile body 12 is larger. For example, even if there are uneven areas in the contact surface between the groove wall surface of the first guiding groove 111 and the profile component 10, or between the groove wall surface of the second guiding groove 112 and the profile component 10, the flat area in the contact surface between the groove wall surface of the first guiding groove 111 and the profile component 10, or between the groove wall surface of the second guiding groove 112 and the profile component 10 can still guide the slider component 20. In this way, the printing quality of the printing device is improved. On the other hand, in the related technology, the interaction force between the V-wheel and the profile is controlled by adjusting the eccentric nut of the V-wheel to make the V-wheel press against the profile. In this example of the application, the elastic member 22 constantly deforms to make the slider body 21 press against the groove wall of the first guiding groove 111, and the elastic member 22 can deform at any time and anywhere. When the groove wall of the first guiding groove 111 or the second guiding groove 112 is uneven, the deformation amount of the elastic member 22 can increase or decrease to automatically adjust the interaction force between the slider body 21 and the groove wall of the first guiding groove 111 to achieve the adaptive adjustment of the interaction force between the slider body 21 and the groove wall of the first guiding groove 111.

In some examples of the present application, the slider body 21 has a receiving cavity 211. One part of the elastic member 22 is in the receiving cavity 211, and another part protrudes from the receiving cavity 211. When the elastic member 22 deforms, the part outside the receiving cavity 211 can shrink into the receiving cavity 211. In this way, the elastic member 22 protruding on the surface of the slider body 21 ensures the sliding connection between the elastic member 22 and the profile component 10, and at least a part of the elastic member 22 will shrink into the receiving cavity 211 after the elastic member 22 deforms. As such, the receiving cavity 211 provides a deformation space for the shape change of the elastic member 22, making the elastic member 22 easier to deform.

The accommodating cavity 211 is used to accommodate part or all of the elastic member 22 after it deforms. Therefore, the size of the opening formed on the surface of the slider body 21 by the accommodating cavity 211 is set to be larger than the size of the elastic member 22, so that the elastic member 22 can be retracted into the accommodating cavity 211. As for the depth of the accommodating cavity 211, along the depth direction of the accommodating cavity 211, if the depth of the accommodating cavity 211 is greater than the length of the elastic member 22, the accommodating cavity 211 can completely or substantially accommodate the elastic member 22, thus increasing the amount of deformation that the elastic member 22 can produce. If the depth of the accommodating cavity 211 is less than the length of the elastic member 22, the accommodating cavity 211 can only accommodate part of the elastic member 22. After the elastic member 22 deforms a certain amount, it will abut against the bottom wall 1111 of the accommodating cavity 211, and part of the elastic member 22 will still protrude on the surface of the slider body 21, ensuring the sliding connection between the elastic member 22 and the profile component 10. At the same time, since the number of elastic members 22 can be multiple, therefore, in some examples of this application, the number of accommodating cavities 211 is equal to the number of elastic members 22, and they are set one-to-one, that is, one accommodating cavity 211 is used to accommodate one elastic member 22. In other examples of this application, the number of accommodating cavities 211 is one, and each elastic member 22 can be retracted into this accommodating cavity 211 after it deforms. As for the shape of the accommodating cavity 211, the examples of this application do not limit it. The accommodating cavity 211 can be any shape, as long as the accommodating cavity 211 can accommodate part or all of the elastic member 22.

In some examples of this application, the slider body 21 comprises a body part 212, which is fixedly connected to the elastic member 22 and is in contact with the groove wall of the first guiding groove 111 and is further slidably connected in a preset direction a. The accommodating cavity 211 is opened in the body part 212. When the elastic member 22 deforms, the body part 212 is pressed against the groove wall of the second guiding groove 112. In this way, the deformation of the elastic member 22 causes the body part 212 to be pressed against the groove wall of the second guiding groove 112. The body part 212 and the elastic member 22 can move relative to the profile component 10 in the preset direction a to realize the movement of the slider component 20 relative to the profile component 10 in the preset direction a. The structure of the slider component 20 is simple and easy to assemble.

The examples of this application do not limit the shape and size of the body part 212, which can be any shape and any size, as long as the body part 212 can slide relative to the profile component 10 and slide in a preset direction a relative to the profile component 10. To reduce the weight of the body part 212, in some examples of this application, the body part 212 is made of aluminum alloy. The aluminum alloy has a low density and high strength, which reduces the weight of the body part 212, facilitates the sliding of the slider component 20 in the preset direction a, and provides sufficient strength of the aluminum alloy, which is beneficial for the body part 212 to connect to the X-axis movement module, Y-axis movement module or the printing nozzle.

In some other examples of this application, the slider body 21 comprises a body part 212 and a pressure receiving part 213. The body part 212 is fixedly connected to the elastic member 22, and the accommodating cavity 211 is opened in the body part 212. The pressure receiving part 213 is set opposite to the elastic member 22 and is fixedly connected to the body part 212. The pressure receiving part 213 is in contact with the groove wall of the first guiding groove 111 and is slidably connected in a preset direction a. When the elastic member 22 deforms, the pressure receiving part 213 is pressed against the groove wall of the second guiding groove 112. In this way, the pressure receiving part 213 will slide relative to the profile component 10 in the preset direction a. After the pressure receiving part 213 is worn, only the pressure receiving part 213 needs to be replaced to complete the repair of the slider body 21, reducing the maintenance cost of the printing device.

The body part 212 serves as the main body of the slider body 21. In the examples of this application, the body part 212 can be made of lightweight material because it does not contact the profile component 10, and the light weight material can include for example, hard plastic or magnesium alloy, etc., and the shape, size, etc. of the body part 212 are not limited. The pressure receiving part 213 is slidably connected with the profile component 10, and is pressed against the profile component 10 by the elastic force from the elastic member 22. To ensure that the pressure receiving part 213 does not deform and is wear-resistant, therefore, in some examples of this application, the pressure receiving part 213 is made of hard wear-resistant material, for example, wear-resistant metal (copper, high manganese steel or wear-resistant high chromium cast iron, etc.) or wear-resistant plastic (polytetrafluoroethylene, nylon, polycarbonate or ultra-high molecular weight polyethylene, etc.). In other examples of this application, the surface of the hard pressure receiving part 213 has a wear-resistant layer, for example, the wear-resistant layer can be formed by thermal spraying or chemical coating of nano-ceramic coating or carbide coating, etc., thus extending the life of the slider body 21. At the same time, the examples of this application do not limit the shape, size, etc. of the pressure receiving part 213, as long as the pressure receiving part 213 can slide relative to the slider body 21 in the preset direction a. As for the connection method between the pressure receiving part 213 and the body part 212, the examples of this application do not limit it, and the connection method can include for example, adhesive, bolt connection or snap-fit detachable fixed connection methods.

Please refer to FIGS. 2 and 3. In some other examples of this application, the slider body 21 comprises a body part 212, a pressure applying part 214, and a pressure receiving part 213. The pressure applying part 214 is located between the body part 212 and the elastic member 22, and is fixedly connected to the body part 212 and the elastic member 22. The accommodating cavity 211 is opened in the pressure applying part 214. The pressure receiving part 213 is fixedly connected to the side of the body part 212 away from the pressure applying part 214. The pressure receiving part 213 is in contact with the groove wall of the first guiding groove 111 and is slidably connected in a preset direction a. When the elastic member 22 deforms, the pressure receiving part 213 is pressed against the groove wall of the second guiding groove 112. In this way, the pressure applying part 214 provides support for the elastic member 22 and the setting of the accommodating cavity 211 provides space for the deformation of the elastic member 22. The pressure applying part 214 is smaller in volume than the body part 212, which facilitates the processing of the accommodating cavity 211.

The main body 212 serves as the main body of the slider body 21, and its working conditions are the same as those of the main body 212 in the above-mentioned example, so the limitation of the main body 212 in this application example is similar to that in the above-mentioned example. The pressure-receiving part 213 is slidably connected with the profile component 10, and is tightly pressed against the profile component 10 due to the elasticity from deformation, and its working conditions are similar to those of the pressure-receiving part 213 in the above-mentioned example, so the limitation of the pressure-receiving part 213 in this application example is similar to that in the above-mentioned example.

The pressing part 214 is used to support the elastic member 22 and open the accommodating cavity 211 to provide an accommodating space for the deformation generated by the elastic member 22. The size of the pressing part 214 in this application example can be determined according to the size and quantity of the elastic member 22. The pressing part 214 is able to open a sufficient number and size of accommodating cavities 211 to accommodate the elastic member 22. In this application example, there are no restrictions on the shape and material of the pressing part 214, as long as the pressing part 214 can support the elastic member 22 and open the accommodating cavity 211. For the connection method between the pressing part 214 and the main body part 212, this application example also does not make any restrictions on, and the connection method can include, for example, adhesive, bolt connection, card connection and other removable fixed connection methods.

As shown in FIGS. 1 and 2, both the first guiding groove 111 and the second guiding groove 112 include a bottom wall 1111 and two oppositely arranged side walls 1112, where both side walls 1112 are connected to the bottom wall 1111, the side walls 1112 are set at an angle with the bottom wall 1111, and the angle is greater than 90°. The number of deformable members is multiple, and the multiple deformable members are in contact with the two side walls 1112 of the corresponding guiding groove and are slidably connected in a preset direction a. In this way, the bottom wall 1111 and the two side walls 1112 of the first guiding groove 111 and the second guiding groove 112 guide the slider assembly 20 and prevent the slider assembly 20 from escaping from the first guiding groove 111 and the second guiding groove 112. After the two side walls 1112 and the bottom wall 1111 of the first guiding groove 111 and the second guiding groove 112 are set at an angle, the guiding member 11 can absorb the vibration generated during the movement of the X-axis movement module and the Y-axis movement module. Further, in some examples of this application, the side walls 1112 and the bottom wall 1111 are set at an angle of 135°. In this way, the guiding member 11 can absorb the vibration generated during the movement of the X-axis movement module and the Y-axis movement module.

As shown in FIG. 1, in some examples of this application, the profile component 10 also includes a profile body 12 and two end caps 13. The profile body 12 is set as a tubular structure, and the two guiding members 11 are set inside the profile body 12 and are connected to the two side walls 1112 opposite to the profile body 12 respectively. The two end caps 13 are connected to the two ends of the profile body 12 along a preset direction a and cover the two ends of the profile body 12. In this way, the inside of the profile body 12 will be hollow, which can greatly reduce the weight of the profile body 12, and the guiding members 11 set inside the profile body 12 can reduce the influence of other parts in the printing device on the guiding members 11, thereby improving the reliability of the printing device. The two end caps 13 are used to cover the two ends of the profile body 12.

The profile body 12 is used to support the guiding member 11. In the examples of the present application, the shape, size, and material of the profile body 12 are not limited, as long as the profile body 12 can support the guiding member 11. In some examples of the present application, the printing device also includes multiple cables 40, which pass through the interior of the profile body 12, and are used to connect the control system of the printing device and other controlled systems.

The end cap 13 is used to cover the openings at both ends of the profile body 12. In the examples of the present application, the shape, size, and material of the port are not limited, and the end cap 13 can be set to any size, shape, and material, as long as the end cap 13 can cover the ports at both ends of the profile body 12.

Please refer to FIG. 1, in some examples of the present application, the profile body 12 has a clearance opening 121 arranged in a preset direction a, and the slider assembly 20 also comprises a connection part 215. One end of the connection part 215 is fixedly connected with the slider body 21, and the other end passes through the clearance opening 121 from the slider assembly 20 and extends to the outside of the profile body 12, to connect other moving modules. It can be understood that when the slider assembly 20 is connected to other moving modules at the part outside the profile body 12, the print head is connected to any moving module in the other moving modules.

The clearance opening 121 is used for the slider assembly 20 to extend out of the profile body 12. In some examples of the present application, the length of the clearance opening 121 in the preset direction a is set to be greater than or equal to the movable distance of the slider assembly 20 in the preset direction a, to ensure that the slider assembly 20 can move in the preset direction a. The shape and processing technology of the clearance opening 121 are not limited in the examples of the present application.

To achieve part of the slider assembly 20 extending outside the profile body 12, in some examples of this application, the slider assembly 20 also comprises a connection part 215. One end of the connection part 215 is connected with the slider body 21, and the connection part 215 extends from the end of the slider body 21 through the clearance opening 121 to the outside of the profile body 12, so that the part of the connection part 215 away from the other end of the slider body 21 is outside the profile body 12. The part of the connection part 215 outside the profile body 12 is connected with the print head or other moving modules.

The shape, material, and size of the connection part 215 are not limited in the examples of this application, as long as the connection part 215 can extend out of the clearance opening 121 and connect to the X-axis moving module, Y-axis moving module or print head. In some examples of this application, the connection part 215 is connected to the body part 212. It can be understood that when the slider assembly 20 comprises a pressure receiving part 213, the connection part 215 can also be connected to the pressure receiving part 213. When the slider assembly 20 comprises a pressure receiving part 213 and a pressure applying part 214, the connection part 215 can also be connected to the pressure receiving part 213 or the pressure applying part 214.

As illustrated in FIG. 1, according to some examples of this application, the moving module also comprises a drive assembly 30, which includes a drive member 31, a screw 32, and a coupler 33. The drive member 31 is fixedly connected with the profile assembly 10; the screw 32 is rotatably connected with the profile assembly 10 and threadedly connected with the slider body 21; the coupler 33 is connected with the screw 32 and the drive member 31. The drive member 31 drives the screw 32 to rotate through the coupler 33, and the screw 32 converts the rotary motion into linear motion, thereby driving the sliding component to move relative to the profile assembly 10 in the preset direction a. In this way, the drive member 31 connects the screw 32 through the coupler 33 and drives it to rotate, and the screw 32 converts the rotary motion of the drive member 31 into linear motion, to achieve the reciprocating motion of the slider assembly 20 in the preset direction a.

The drive member 31 is used to drive the screw 32 to rotate, and then drive the slider assembly 20 to move along the preset direction a through the screw 32. In order to accurately control the movement position of the slider assembly 20, in some examples of this application, the drive member 31 includes a servo motor. The rotation speed of the servo motor rotor is controlled by the input signal and can respond quickly. It is used as an actuator in the automatic control system, with small electromechanical time constant and high linearity. The position accuracy is very accurate, and it can convert the received electrical signal into angular displacement or angular velocity output on the motor shaft. In some other examples of this application, the drive member 31 includes a stepper motor. The stepper motor converts electrical pulse signals into corresponding angular displacement or linear displacement. For each input pulse signal, the rotor rotates by an angle or advances by a step. The position accuracy is also very accurate.

The coupler 33 is used to connect two shafts or a shaft and a rotary member, and rotates together in the process of transmitting motion and power. In the examples of this application, the coupler 33 is used to connect the output shaft of the drive member 31 and the screw 32. To achieve shock absorption and vibration damping, in some examples of this application, the coupler 33 is a flexible coupler 33 made of elastic elements, for example, an elastic sleeve pin coupler 33, an elastic pin coupler 33, a plum-shaped coupler 33, a tire-type coupler 33, a serpentine spring coupler 33, or a leaf spring coupler 33, etc.

The screw is used to convert the rotary motion of the drive member 31 into linear motion. In some examples of this application, the screw is threadedly connected with the slider body 21, and the forward and reverse rotation of the drive member 31 drives the screw 32 to rotate forward and backward to achieve the reciprocating movement of the slider assembly 20 in the preset direction a.

In the accompanying drawings of this example, the same or similar numbers correspond to the same or similar components; in the description of this application, it should be understood that if there are terms such as “up”, “down”, “left”, “right”, etc., indicating the orientation or positional relationship, it is based on the orientation or positional relationship shown in the drawings, and is only for the convenience of describing this application and simplifying the description, and does not indicate or imply that the device or component referred to must have a specific orientation, be constructed and operated in a specific orientation. Therefore, the terms describing positional relationships in the drawings are only for illustrative purposes and should not be understood as limiting this patent. For those skilled in the art, the specific meanings of the above terms can be understood according to the specific situation.

The above illustrates examples of this application and is not intended to limit this application. Any modifications, equivalent replacements, and improvements made within the spirit and principle of this application should be included within the scope of protection of this application.

What is claimed is:

1. A printing device comprises a moving module, the moving module comprising a profile assembly and a slider assembly, wherein:
- the profile assembly comprises a first guiding member and a second guiding member, the first guiding member having a first guiding groove and the second guiding member having a second guiding groove, and wherein the first guiding groove and the second guiding groove are arranged in a preset direction;
- the slider assembly comprises:
  - a slider body, which is in contact with a first groove wall of the first guiding groove and is slidably connected with the first groove wall of the first guiding groove in the preset direction; and
    - an elastic member, which is fixedly connected with the slider body and is in contact with a second groove wall of the second guiding groove, and is slidably connected with the groove wall of the second guiding groove in the preset direction,
    - wherein the elastic member is configured to generate deformation to enable the slider body to press against the first guiding member.

2. The printing device according to claim 1, wherein the elastic member is a wear-resistant elastic member or the surface of the elastic member has a wear-resistant layer.

3. The printing device according to claim 1, wherein the slider body has a receiving cavity, wherein:
- a first portion of the elastic member is in the receiving cavity;
- a second portion of the elastic member protrudes outside the receiving cavity; and
- the second portion of the elastic member protruding outside the receiving cavity is configured to retract into the receiving cavity upon a deformation of the elastic member.

4. The printing device according to claim 3, wherein the slider body comprises:
- a body part, which is fixedly connected with the elastic member and is in contact with the first groove wall of the first guiding groove and is slidably connected along the preset direction;
- and wherein:
  - the receiving cavity is opened in the body part, and the body part is configured to be pressed against the second groove wall of the second guiding groove upon a deformation of the elastic member.

5. The printing device according to claim 3, wherein the slider body comprises:

a body part, which is fixedly connected with the elastic member, and the receiving cavity is opened in the body part; and a pressure receiving part, which is set opposite to the elastic member and is fixedly connected with the body part, wherein the pressure receiving part is in contact with the first groove wall of the first guiding groove and is slidably connected along the preset direction, and wherein the pressure receiving part is configured to be pressed against the second groove wall of the second guiding groove upon a deformation of the elastic member.

6. The printing device according to claim 3, wherein the slider body comprises:

a body part;

a pressure applying part, which is located between the body part and the elastic member and is fixedly connected with the body part and the elastic member, wherein the receiving cavity is opened in the pressure applying part; and a pressure receiving part, which is fixedly connected with the body part on a side away from the pressure applying part, wherein the pressure receiving part is in contact with the first groove wall of the first guiding groove and is slidably connected along the preset direction, wherein the pressure receiving part is configured to be pressed against the second groove wall of the second guiding groove upon a deformation of the elastic member.

7. The printing device according to claim 1, wherein the first guiding groove and the second guiding groove each comprises:

a bottom wall;

two opposite side walls, which are connected to two end faces of the bottom wall parallel to the preset direction, wherein the two opposite side walls are set at an angle with the bottom wall and the angle is greater than 90°; and a plurality of deformation members, wherein each of the plurality of deformation members is in contact with the two opposite side walls of the second guiding groove and is slidably connected in the preset direction.

8. The printing device according to claim 7, wherein the profile assembly further comprises:

a profile body comprising a tubular structure, wherein the first guiding member and the second guiding member are set inside the profile body and are connected to the two opposite side walls of the profile body; and two end caps, which are connected to the two ends of the profile body in the preset direction and cover the two ends of the profile body.

9. The printing device according to claim 8, wherein the profile body comprises a clearance opening arranged in the preset direction, wherein the slider body further comprises:

a connecting part, wherein one end of the connecting part is fixedly connected with the slider body, and another end of the connecting part passes through the clearance opening from the slider assembly and extends to an outside of the profile body to connect other moving modules.

10. The printing device according to claim 1, wherein the moving module further comprises a drive assembly, the drive assembly comprising:

a drive member, which is fixedly connected with the profile assembly;

a screw, which is rotatably connected with the profile assembly and threadedly connected with the slider body; and a coupler, which is connected with the screw and the drive member, wherein the drive member drives the screw to rotate through the coupler, and wherein the screw converts a rotary motion into a linear motion, and drives the sliding assembly to move relative to the profile assembly in the preset direction.

11. A moving module in a printing device comprising:

a profile assembly comprising a first guiding member having a first guiding groove, and a second guiding member having a second guiding groove, wherein the first guiding member and the second guiding member are spaced from each other, and the first guiding groove and the second guiding groove are arranged in a preset direction; and a slider assembly comprising a slider body and an elastic member, wherein the slider body is in contact with and slidably connected with a first groove wall of the first guiding groove in the preset direction, wherein the elastic member is in contact with and slidably connected with a second groove wall of the second guiding groove in the preset direction.

12. The moving module according to claim 11, wherein the elastic member is further configured to generate deformation to enable the slider body to press against the first guiding member.

13. The moving module according to claim 11, wherein the elastic member comprises a wear-resistant elastic member, or the surface of the elastic member has a wear-resistant layer.

14. The moving module according to claim 11, wherein the slider body has a receiving cavity, wherein:

a first portion of the elastic member is in the receiving cavity;

a second portion of the elastic member protrudes outside the receiving cavity; and the second portion of the elastic member protruding outside the receiving cavity is configured to retract into the receiving cavity upon a deformation of the elastic member.

15. The moving module according to claim 14, wherein the slider body comprises:

a body part that is:

fixedly connected with the elastic member;

in contact with the first groove wall of the first guiding groove; and slidably connected along the preset direction;

and wherein:

the receiving cavity is opened in the body part, and the body part is configured to press against the second groove wall of the second guiding groove upon a deformation of the elastic member.

16. The moving module according to claim 14, wherein the slider body comprises:

a body part that is fixedly connected with the elastic member, wherein the receiving cavity is opened in the body part; and a pressure receiving part that is:

set opposite to the elastic member fixedly connected with the body part;

in contact with the first groove wall of the first guiding groove and slidably connected along the preset direction;

wherein the pressure receiving part is configured to press against the second groove wall of the second guiding groove upon a deformation of the elastic member.

17. The moving module according to claim 14, wherein the slider body comprises:

a body part; and a pressure applying part that is:

located between the body part and the elastic member; and fixedly connected with the body part and the elastic member;

wherein the receiving cavity is opened in the pressure applying part; and a pressure receiving part that is:

fixedly connected with the body part on a side away from the pressure applying part;

in contact with the first groove wall of the first guiding groove and slidably connected along the preset direction;

wherein the pressure applying part is configured to press against the second groove wall of the second guiding groove upon a deformation of the elastic member.

18. The moving module according to claim 11, wherein the first guiding groove and the second guiding groove each comprises:

a bottom wall;

two opposite side walls connected to two end faces of the bottom wall parallel to the preset direction, wherein the two opposite side walls are set at an angle with the bottom wall and the angle is greater than 90°; and a plurality of deformation members, wherein each of the plurality of deformation members is in contact with the two opposite side walls of the second guiding groove and is slidably connected in the preset direction.

19. The moving module according to claim 18, wherein the profile assembly further comprises:

a profile body comprising a tubular structure, wherein the first guiding member and the second guiding member are set inside the profile body and are connected to the two opposite side walls of the profile body; and two end caps that are connected to the two ends of the profile body in the preset direction and cover the two ends of the profile body.

20. A moving module in a printing device comprising:

a profile assembly comprising:

a first guiding member having a first guiding groove, a second guiding member having a second guiding groove, and a profile body comprising a tubular structure, wherein the first guiding member and the second guiding member are set inside the profile body and connected to two opposite side walls of the profile body, and the first guiding groove and the second guiding groove are set in a preset direction; and a slider assembly that is in contact with and slidably connected with a first groove wall of the first guiding groove in the preset direction, and to be in contact with and slidably connected with a second groove wall of the second guiding groove in the preset direction.

* * * * *